Patented July 19, 1938

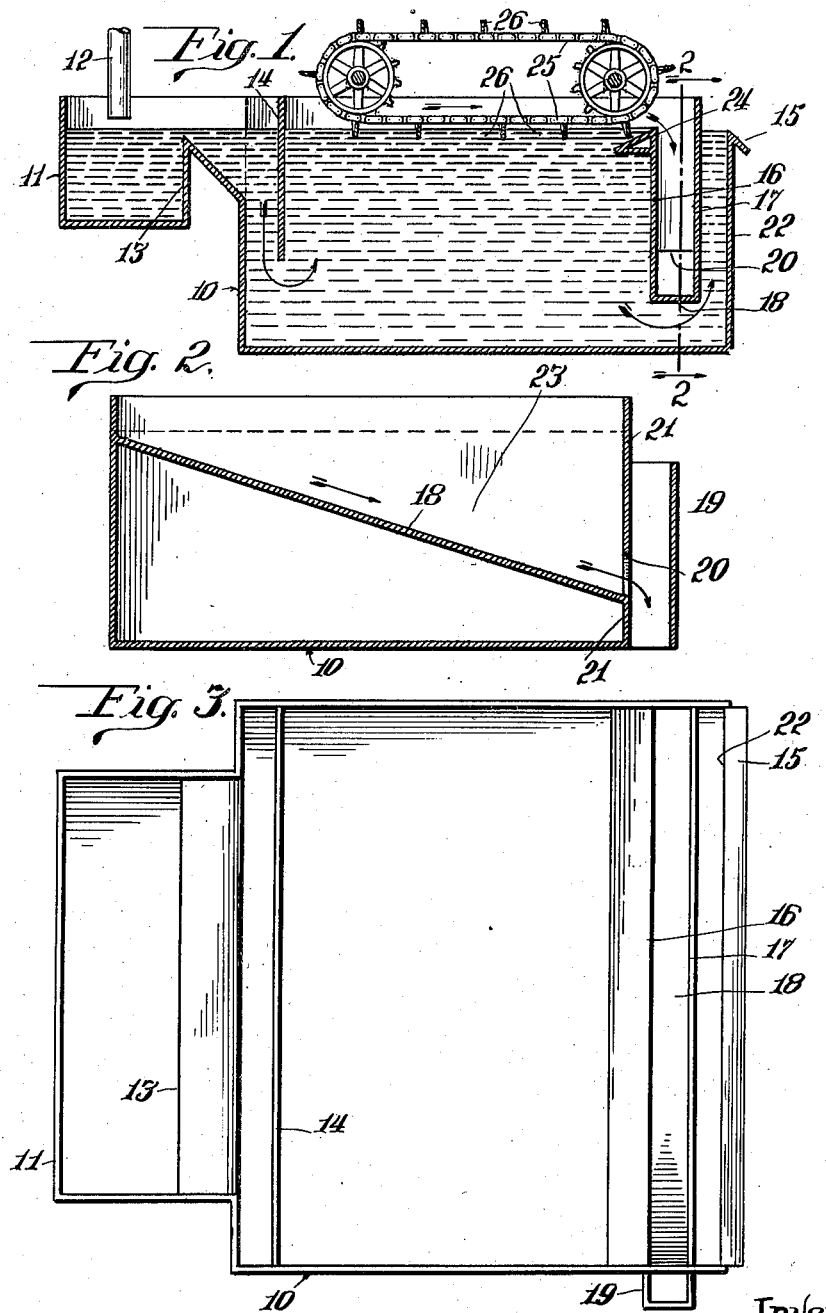

2,124,284

UNITED STATES PATENT OFFICE 2,124,284

SEPARATION OF STARCH FROM GLUTEN

Hans Boie, Barby, Germany, assignor to International Patents Development Company, Wilmington, Del., a corporation of Delaware Application October 19, 1935, Serial No. 45,794
In Germany May 6, 1935

2 Claims. (Cl. 127—27)

This invention relates to the treatment of starch and gluten mixtures for the separation of the component solids; and more particularly to the treatment, in the manufacture of starch from corn, of the so-called "corn gluten", really a mixture of gluten and starch, derived from the tabling or centrifuging of the so-called starch milk or mill starch, which latter is a mixture of starch and gluten, with the starch much in excess, coming from the operations of separating the germ and slop from the ground corn. Ordinarily corn gluten contains about 50% insoluble protein (gluten in the proper sense of the term) and from 35 to 40% starch, the rest being fat, ash, sugar, cellulosic matters and other impurities.

Heretofore it has been possible to adequately remove the starch from corn gluten, if at all, only by expensive and inconvenient methods usually involving the use of chemicals. The removal of starch from corn gluten is desirable, first, in order to recover the starch; second, in order to increase the protein content of the gluten which, for some purposes, should be as free of starch as possible.

The starch and gluten mixture will contain ordinarily considerable quantities of water which it is desirable to reuse in the starch making process; and the complete or substantially complete removal of the solids, starch and insoluble protein, from the water, as well as their separation one from the other is desirable in order that the water may be as advantageously used as possible in the washing operations for which it is intended when returned to the process.

The principal object of the present invention is to provide a simple and economical method of effecting these separations by means essentially mechanical; and to provide, also, a suitable apparatus for carrying out the process of separation in the least possible time.

The apparatus is illustrated diagrammatically in the accompanying drawing, wherein:

Fig. 1 is a longitudinal sectional view of the apparatus;

Fig. 2 is a cross-sectional view on line 2—2 of Fig. 1; and

Fig. 3 is a plan view of the apparatus with the gluten conveyor omitted.

The process consists, essentially, in causing a water suspension of gluten (starch and protein), at a suitable density, preferably at a density represented by a range of 300 to 1500 grains of dry substance solids in a gallon of water, into which a levitating gas, for example air, has been introduced, to pass through the apparatus, as shown, in order to allow the subsidence of the starch and the rising to the surface of the liquid and flotation thereon of the gluten, to which the air bubbles appear to attach themselves. The levitating gas can be injected into the suspension in the flotation apparatus, as shown; but preferably this operation will take place before the liquid mixture reaches the flotation apparatus. The gas may be air injected under compression into the liquid, or atmospheric air beaten into the liquid in any suitable manner. In either case there should be an even distribution of the gas throughout the liquid in the form of minute bubbles. The air goes with the gluten as it leaves the starch and water mixture.

The starch may be allowed to deposit in a layer in the bottom of the flotation vessel, to be removed at intervals during interruptions of the process; or it may be drawn out, continuously, or intermittently, from the bottom of the vessel in the form of a highly concentrated starch suspension; or it may be drawn off in the form of a very thin water mixture to be used in other steps of the process. The gluten rising to the surface of the liquid is removed therefrom in any suitable manner. The bulk of the water, assuming a continuous operation of the process, as is desirable although not necessary, flows over one edge of the vessel, preferably through a passageway into which the water enters near the bottom of the vessel.

Referring now to the drawing, 10 designates the flotation vessel with which is associated at one end a filling vessel 11 into which the gluten mixture is introduced through conduit 12. Interposed between the filling vessel and the flotation vessel is a dam or weir 13 and projecting into the flotation vessel in front of the weir 13 is a partition 14 providing a downwardly extending inflow passage. At the other end the flotation vessel is provided with an overflow lip 15 for the water. Extending across this end of the vessel is a structure, formed by the walls 16—17 and sloping bottom member 18, which serves two purposes: It provides for the discharge of the gluten, which enters chute 19 through the opening 20 in one of the side walls 21 of vessel 10. It also provides, with the end wall 22 of the flotation vessel, a narrow passage-way extending from near the bottom of the vessel 10 to the lip 15 for discharge of the water. The gluten is swept into the discharge passageway 23, formed between walls 16 and 17, over a weir 24 by means of an endless conveyor belt 25 preferably provided with paddles 26.

No claim is made herein to any invention common to this application and the application of Paul R. Sheffer, Serial No. 49,231, filed November 11, 1935.

I claim:

1. Apparatus for separating starch and gluten comprising in combination: a flotation vessel; a filling vessel; a weir between the filling and flotation vessels; a partition extending into the liquid in the flotation vessel in front of said weir; a discharge lip for waste water at the other end of the flotation vessel; a double-walled, transverse structure adjacent the discharge end of the flotation vessel, the inner wall of which provides a weir over which the gluten flows, the outer wall of which forms with the adjacent end wall a passage for the waste water extending from near the bottom of the vessel to the discharge lip; a transversely inclined surface between the two walls of said transverse structure forming the bottom of a trough for receiving the gluten and leading to a discharge opening; and a conveyor for sweeping the gluten over the last named weir into said trough.

2. Apparatus for separating starch and gluten comprising in combination: a flotation vessel; a filling vessel; a weir between the filling and flotation vessels; a partition extending into the liquid in the flotation vessel in front of said weir; a discharge lip for waste water at the other end of the flotation vessel; a double-walled, transverse structure adjacent the discharge end of the flotation vessel, the inner wall of which provides a weir over which the gluten flows, the outer wall of which forms with the adjacent end wall a passage for the waste water extending from near the bottom of the vessel to the discharge lip; a slanting guide surface attached to the upper edge of said inner wall; a transversely inclined surface between the two walls of said transverse structure forming the bottom of a trough for receiving the gluten and leading to a vertical discharge opening; and a conveyor extending between said respective weirs for sweeping the gluten onto said guide surface and into said trough.

HANS BOIE.